United States Patent

Ashiba

[11] Patent Number: 5,386,892
[45] Date of Patent: Feb. 7, 1995

[54] HYDRAULIC SHOCK ABSORBER WITH SHUTTERS

[75] Inventor: Masahiro Ashiba, Kanagawa, Japan
[73] Assignee: Tokico, Ltd., Kanagawa, Japan
[21] Appl. No.: 128,764
[22] Filed: Sep. 17, 1993

[30] Foreign Application Priority Data

Sep. 18, 1992 [JP] Japan .................................. 4-275305
Jul. 15, 1993 [JP] Japan .................................. 5-197893

[51] Int. Cl.[6] ............................ F16F 9/44; F16F 9/50
[52] U.S. Cl. .................................... 188/282; 188/280;
    188/317; 188/322.13; 188/322.22; 188/322.15
[58] Field of Search ............... 188/280, 282, 281, 299,
    188/319, 322.15, 322.22, 322.13, 317, 320, 318

[56] References Cited

U.S. PATENT DOCUMENTS 4,765,446  8/1988  Murata et al. ............. 188/322.15 X
5,248,014  9/1993  Ashiba ......................... 188/282
5,316,116  5/1994  Furuya et al. ............. 188/319 X

FOREIGN PATENT DOCUMENTS 62-25346  2/1987  Japan .

Primary Examiner—Douglas C. Butler
Attorney, Agent, or Firm—Wenderoth, Lind & Ponack

[57] ABSTRACT

In the disclosed hydraulic shock absorber, damping force characteristics are adjusted in accordance with the frequency of stroke, and the damping force is made small at the time when the directions of stroke are changed from one to the other. Cylinder upper and lower chambers are communicated with each other through main hydraulic fluid passage and first and second bypass passages. During the extension stroke, the second bypass passage is cut off by a check valve, and a shutter in the first bypass passage is slid in accordance with the frequency of stroke by the fluid flowing through an orifice passage to regulate the passage area of the first bypass passage. During the contraction stroke, the first bypass passage is cut off by a check valve, and a shutter in the second passage is slid in accordance with the frequency of stroke by the fluid flowing through an orifice passage to regulate the passage area of the second bypass passage. During either of the extension and contraction strokes, the shutter for the other stroke returns to the original position by the action of the hydraulic pressure in the cylinder.

3 Claims, 5 Drawing Sheets

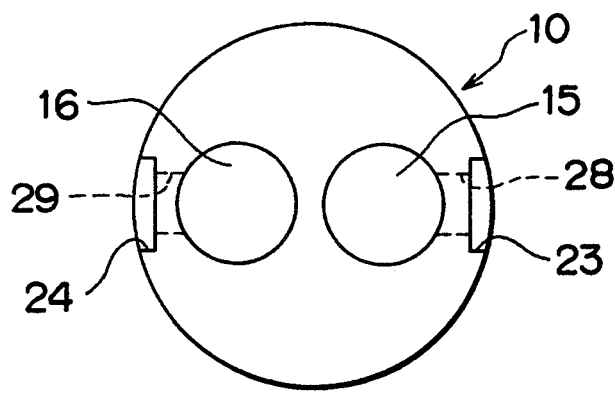
Fig. 4
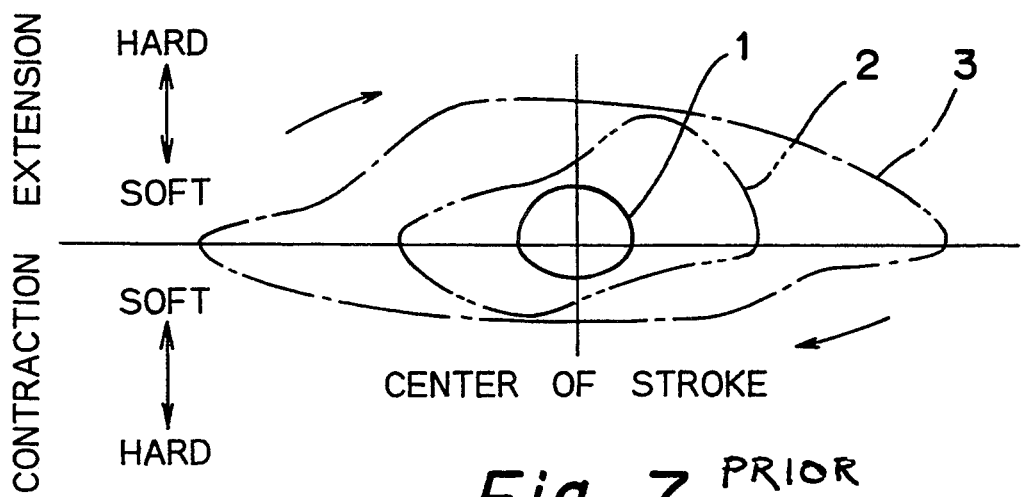
Fig. 5
Fig. 7 PRIOR ART
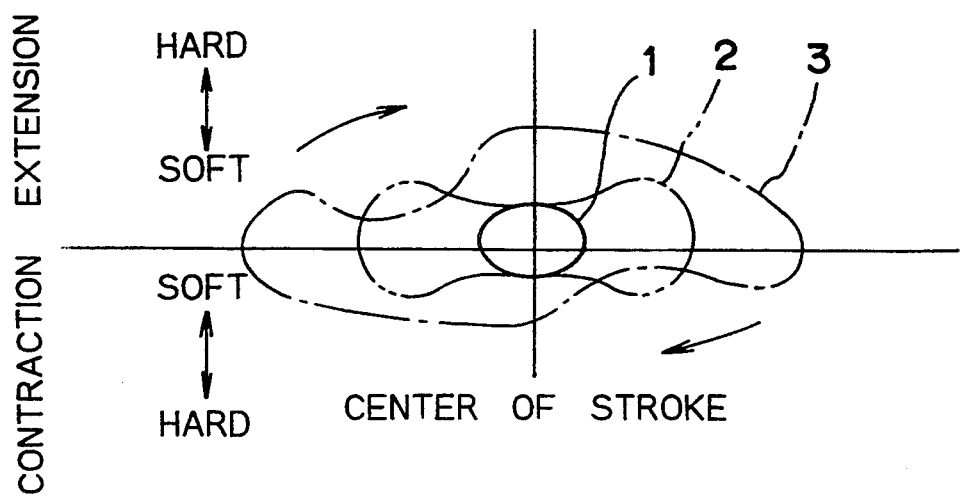

HYDRAULIC SHOCK ABSORBER WITH SHUTTERS

BACKGROUND OF THE INVENTION

1. Field of the Invention

The present invention relates to a hydraulic shock absorber attached to a suspension system of a vehicle, for example, an automobile.

2. Description of the Related Art

In general, a hydraulic shock absorber attached to a suspension system of a vehicle includes a cylinder having a hydraulic fluid sealed therein, and a piston slidably fitted in the cylinder to define therein two chambers, which are communicated with each other through a communicating passage. The flow of hydraulic fluid in the communicating passage caused by sliding movement of the piston is controlled by an orifice passage and a disk valve mechanism, thereby generating damping force. When the piston speed is relatively low, the hydraulic shock absorber exhibits damping force characteristics (orifice characteristics) in which the damping force changes quadratically with the piston speed by the restrictor action of the orifice passage. When the piston speed exceeds a predetermined level, damping force characteristics (valve characteristics) in which the damping force changes linearly with the piston speed are provided by the action of the disk valve.

Incidentally, for improvement in the ride quality and steering stability of the vehicle, the hydraulic shock absorber is desired to exhibit damping force characteristics as follows: During normal running of the vehicle that is accompanied by fine vibration of the mass under the spring of the suspension system, orifice and valve characteristics which produce relatively small damping force are desired. During a turning or braking operation that is accompanied by relatively slow and large vibration of the mass under the spring of the suspension system, orifice and valve characteristics which produce relatively large damping force are desired.

Under these circumstances, a hydraulic shock absorber has been proposed in which the orifice characteristics on the extension side are changed with the frequency of vibration of the mass under the spring of the suspension system such that when the frequency of the vibration is relatively low, the orifice passage area is reduced to generate relatively large damping force, whereas, when the frequency of the vibration is relatively high, the orifice passage area is increased to reduce the damping force, thereby improving the ride quality and steering stability of the vehicle, as is disclosed, for example, in Japanese Utility Model Public Disclosure (KOKAI) No. 62-25346.

The above-described conventional hydraulic shock absorber suffers, however, from the problem that since only the orifice characteristics on the extension side are changed, no satisfactory improvement can be obtained in the ride quality and steering stability for the contraction side.

In view of the above-described circumstances, the assignee of the present invention has proposed a frequency-sensitive hydraulic shock absorber in Japanese Patent Application No. 2-283852, in which orifice characteristics (alternatively, together with valve characteristics) on both the extension and contraction sides change with the frequency of vibration under the spring of the suspension system.

However, the proposed frequency-sensitive hydraulic shock absorber involves problems as stated below:

In the above-described hydraulic shock absorber, a shutter is displaced by the pressure of hydraulic fluid produced in accordance with the frequency of stroke of a piston rod so as to open and close a bypass passage, thereby controlling the damping force characteristics such that when the frequency is relatively high, relatively small damping force ("soft" characteristics) is generated, whereas, when the frequency is relatively low, relatively large damping force ("hard" characteristics) is generated.

In the above-described hydraulic shock absorber, if the direction of stroke of the piston rod changes when the frequency is relatively low and hence the damping force has become relatively large as a result of the displacement of the shutter, impact is generated because of the "hard" damping force characteristics. In addition, as the shutter moves, the damping force characteristics once change over from "hard" to "soft" and then return to "hard". Consequently, the damping force characteristics change over during the stroke of the piston rod on the extension or contraction side, causing impact to be generated. Thus, the ride quality of the vehicle is degraded.

SUMMARY OF THE INVENTION

In view of the above-described circumstances, it is an object of the present invention to provide a frequency-sensitive hydraulic shock absorber which enables damping force characteristics to be changed over smoothly for both the extension and contraction strokes without any influence on each other's damping force control operation.

To attain the above-described object, the present invention provides a hydraulic shock absorber including a cylinder having a hydraulic fluid sealed therein, and a piston slidably fitted in the cylinder to define therein two cylinder chambers, which are communicated with each other through a main hydraulic fluid passage and first and second bypass passages. The flow of the hydraulic fluid in the main hydraulic fluid passage and the first and second bypass passages caused by sliding movement of the piston is controlled to generate damping force, and the passage areas of the first and second bypass passages are regulated to adjust damping force characteristics. The hydraulic shock absorber further includes a first check valve provided in the first bypass passage to allow the hydraulic fluid to flow only from one toward the other of the two cylinder chambers, and a first shutter mechanism including a first guide and a first shutter slidably fitted in the first guide to define two chambers in the guide. The first shutter mechanism is arranged such that when the first shutter moves toward one side, the first bypass passage is opened, whereas, when the first shutter moves toward the other side, the first bypass passage is closed. A first spring abuts at one end thereof on the first shutter and at the other end thereof on the first guide to bias the first shutter toward one side. A first communicating passage provides communication between the chamber defined in the first guide on one side of the first shutter and one of the two cylinder chambers. A second communicating passage provides communication between the chamber defined in the first guide on the other side of the shutter and the other of the two cylinder chambers. A first orifice is provided in at least one of the first and second communicating passages. A second check valve is provided in the second bypass passage to allow the hydraulic fluid to flow only from the other toward the one of the two cylinder chambers. A second shutter mechanism includes a second guide and a second shutter slidably fitted in the second guide to define two chambers in the second guide. The second shutter mechanism is arranged such that when the second shutter moves toward one side, the second bypass passage is opened, whereas, when the second shutter moves toward the other side, the second bypass passage is closed. A second spring abuts at one end thereof on the second shutter and at the other end thereof on the second guide to bias the second shutter toward one side. A third communicating passage provides communication between the chamber defined in the second guide on one side of the second shutter and the other of the two cylinder chambers. A fourth communicating passage provides communication between the chamber defined in the second guide on the other side of the second shutter and the one of the two cylinder chambers. A second orifice is provided in at least one of the third and fourth communicating passages.

BRIEF DESCRIPTION OF THE DRAWINGS:

The above and other objects, features and advantages of the present invention will become more apparent from the following description of the preferred embodiments thereof, taken in conjunction with the accompanying drawings, in which like reference numerals denote like elements, and of which:

FIG. 4 is a plan view of a guide member employed in the embodiment shown in FIG. 1;

FIG. 5 is a graph showing damping force characteristics of the first to fourth embodiments of the present invention;

FIG. 7 is a graph showing damping force characteristics of a conventional frequency-sensitive hydraulic shock absorber.

DESCRIPTION OF THE PREFERRED EMBODIMENTS

Embodiments of the present invention will be described below in detail with reference to the accompanying drawings.

Figure 1:
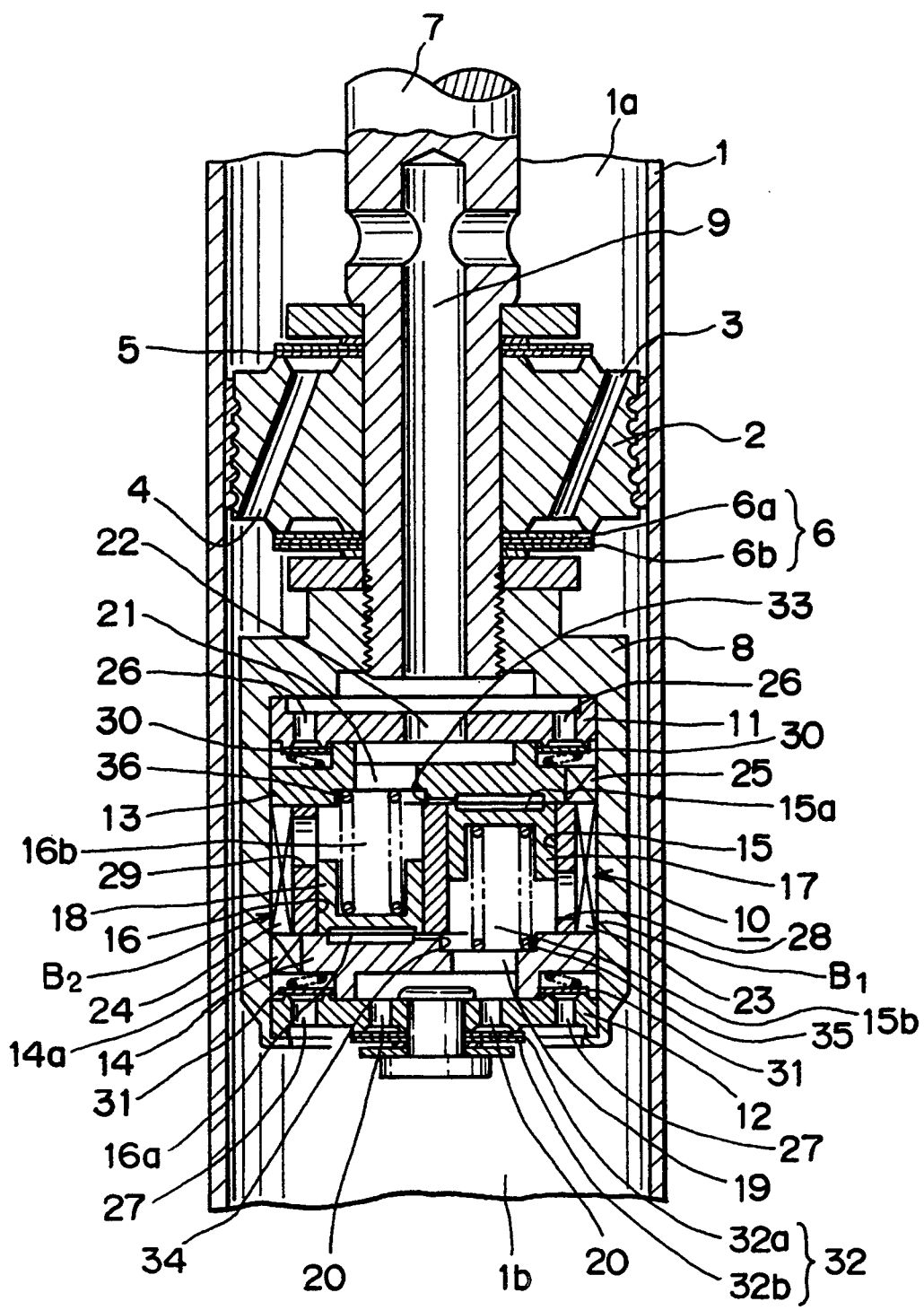
FIG. 1 is a longitudinal sectional view showing an essential part of a first embodiment of the present invention.

A first embodiment of the present invention will be described with reference to FIGS. 1, 4 and 5. As shown in FIG. 1, a cylinder 1 has a hydraulic fluid sealed therein, and a piston 2 is slidably fitted in the cylinder 1. The piston 2 divides the inside of the cylinder 1 into two chambers, that is, a cylinder upper chamber 1a and a cylinder lower chamber 1b. The piston 2 is provided with two main hydraulic fluid passages 3 and 4, which provide communication between the cylinder upper chamber 1a and the cylinder lower chamber 1b. The end face of the piston 2 that is closer to the cylinder upper chamber 1a is provided with a damping force generating mechanism 5 comprising disk valves for generating damping force by controlling the flow of the hydraulic fluid in the main hydraulic fluid passage 4. The end face of the piston 2 that is closer to the cylinder lower chamber 1b is provided with a damping force generating mechanism 6 comprising an orifice 6a and disk valves 6b for generating damping force by controlling the flow of the hydraulic fluid in the main hydraulic fluid passage 3.

A piston rod 7 extends through the piston 2 from the cylinder upper chamber side to the cylinder lower chamber side. The piston rod 7 has a cylindrical passage member 8 screwed onto the inner end portion thereof, thereby being secured to the piston 2. The piston rod 7 is provided with an axial hydraulic fluid passage 9 to provide communication between the cylinder upper chamber 1a and the inside of the passage member 8 provided on the cylinder lower chamber side. The passage member 8 and the hydraulic fluid passage 9 constitute in combination a bypass passage that provides communication between the cylinder upper chamber 1a and the cylinder lower chamber 1b. The other end portion of the piston rod 7 extends as far as the outside of the cylinder 1 through a rod guide (not shown) and a seal member (not shown), which are provided in the end portion of the cylinder 1.

The cylinder 1 is provided with a reservoir chamber (not shown) for compensating for a change in amount of hydraulic fluid in the cylinder 1 that corresponds to the amount by which the piston rod 7 enters or withdraws from the cylinder 1 as it performs reciprocating motion.

In the passage member 8 are fitted a guide member 10, valve members 11 and 12, and partition members 13 and 14.

The guide member 10 is provided with cylindrical guide portions 15 and 16. A plan view of the guide member 10 is shown in FIG. 4. The guide portion 15 has a shutter 17 slidably fitted therein. The shutter 17 divides the inside of the guide portion 15 into two chambers, that is, a chamber 15a and a chamber 15b. Similarly, the guide portion 16 has a shutter 18 slidably fitted therein. The shutter 18 divides the inside of the guide portion 16 into two chambers, that is, a chamber 16a and a chamber 16b. The guide portion 15 and the shutter 17 constitute in combination a first shutter mechanism. The guide portion 16 and the shutter 18 constitute in combination a second shutter mechanism. The chamber 15b of the first shutter mechanism is communicated with the cylinder lower chamber 1b through a second communicating passage comprising a passage 19 formed in the partition member 14 and passages 20 formed in the valve member 12. The chamber 16b of the second shutter mechanism is communicated with the cylinder upper chamber 1a through a fourth communicating passage comprising a passage 21 formed in the partition member 13, a passage 22 formed in the valve member 11, and the hydraulic fluid passage 9 in the piston rod 7.

Passages 23 and 24 are formed between the guide member 10 and the side wall of the passage member 8. The passage 23 is communicated with the cylinder upper chamber 1a through a passage 25 formed in the partition member 13, passages 26 formed in the valve member 11 and the hydraulic fluid passage 9 in the piston rod 7. The passage 24 is communicated with the cylinder lower chamber 1b through a passage 14a formed in the partition member 14 and passages 27 formed in the valve member 12.

The guide member 10 is provided with a port 28 for communication between the chamber 15b in the guide portion 15 and the passage 23, and a port 29 for communication between the chamber 16$b$ in the guide portion 16 and the passage 24. The port 28 is disposed so that when the shutter 17 has been moved to the side of the chamber 15$a$, the port 28 is communicated with the chamber 15$b$ and the passage 23, whereas, as the shutter 17 slides toward the chamber 15$b$, the port 28 decreases in the passage area and is eventually shut off from the communication. Similarly, the port 29 is disposed so that when the shutter 18 has been moved to the side of the chamber 16$a$, the port 29 is communicated with the chamber 16$b$ and the passage 24, whereas, as the shutter 18 slides toward the chamber 16$b$, the port 29 decreases in the passage area and is eventually shut off from the communication.

Thus, a first bypass passage $B_1$ for providing communication between the cylinder upper chamber 1$a$ and the cylinder lower chamber 1$b$ is composed of the hydraulic fluid passage 9, the passages 26 in the valve member 11, the passage 25 in the partition member 13, the passage 23 in the guide member 10, the port 28, the chamber 15$b$, the passage 19 in the partition member 14, and the passages 20 in the valve member 12. The passages 26 in the valve member 11 are provided with check valves 30 that allow the hydraulic fluid to flow only from the cylinder upper chamber 1$a$ toward the cylinder lower chamber 1$b$ through the first bypass passage $B_1$. A second bypass passage $B_2$ for providing communication between the cylinder upper chamber 1$a$ and the cylinder lower chamber 1$b$ is composed of the hydraulic fluid passage 9, the passage 22 in the valve member 11, the passage 21 in the partition member 13, the chamber 16$b$ in the guide member 10, the port 29, the passage 24, the passage 14$a$ in the partition member 14, and the passages 27 in the valve member 12. The passages 27 in the valve member 12 are provided with check valves 31 that allow the hydraulic fluid to flow only from the cylinder lower chamber 1$b$ toward the cylinder upper chamber 1$a$ through the second bypass passage $B_2$. In addition, the valve member 12 is provided with a damping force generating mechanism 32 comprising an orifice 32$a$ and a disk valve 32$b$ for generating damping force by controlling the flow of hydraulic fluid through the passages 20.

Between the guide member 10 and the partition member 13 is formed an orifice passage 33 serving as a first communicating passage and a first orifice. The orifice passage 33 allows the chamber 15$a$ in the first shutter mechanism to communicate with the cylinder upper chamber 1$a$. Between the guide member 10 and the partition member 14 is formed an orifice passage 34 serving as a third communicating passage and a second orifice. The orifice passage 34 allows the chamber 16$a$ in the guide portion 16 to communicate with the cylinder lower chamber 1$b$. It should be noted that the orifice 32$a$ of the damping force generating mechanism 32 has a passage area set larger than that of the orifice passage 34.

Between the shutter 17 and the partition member 14 secured to the guide member 10 is interposed a spring 35 serving as a first spring for biasing the shutter 17 toward the chamber 15$a$. Between the shutter 18 and the partition member 13 secured to the guide member 10 is interposed a spring 36 serving as a second spring for biasing the shutter 18 toward the chamber 16$a$.

The operation of the first embodiment, arranged as described above, will be explained below.

Normally, the shutter 17 is biased toward the chamber 15$a$ by the spring 35 to open the port 28, and the shutter 18 is also biased toward the chamber 16$a$ by the spring 36 to open the port 29. Accordingly, both the first and second bypass passages $B_1$ and $B_2$ are open.

During the extension stroke of the piston rod 7, the hydraulic fluid on the cylinder upper chamber side is pressurized to flow toward the cylinder lower chamber 1$b$ as the piston 2 slides. At this time, the check valves 31 are closed, and thus the second bypass passage $B_2$ is cut off. In addition, the hydraulic fluid on the cylinder upper chamber side flows into the chamber 15$a$ in the guide portion 15 through hydraulic fluid passage 9, the passage 22, the passage 21, and the orifice passage 33, causing the shutter 17 to move toward the chamber 15$b$.

In this case, if the speed of the piston 2 is high and the amplitude of reciprocation thereof is small (i.e., high frequency), the flow rate of hydraulic fluid flowing into the chamber 15$a$ through the orifice passage 33 is relatively low, and hence the amount of movement of the shutter 17 toward the chamber 15$b$ is relatively small. Accordingly, the port 28 is still open to provide communication for the first bypass passage $B_1$. Therefore, the hydraulic fluid in the cylinder upper chamber 1$a$ flows into the cylinder lower chamber 1$b$ through the first bypass passage $B_1$. Thus, relatively small damping force is generated by the action of the orifice 32$a$ and disk valve 32$b$ of the damping force generating mechanism 32 provided on the valve member 12.

When the speed of the piston 2 is low and the amplitude of reciprocation increases (i.e., the frequency lowers), the flow rate of hydraulic fluid flowing into the chamber 15$a$ through the orifice passage 33 increases, and hence the amount of movement of the shutter 17 toward the chamber 15$b$ increases. Accordingly, the opening area of the port 28 decreases, and the flow resistance in the first bypass passage $B_1$ increases correspondingly, resulting in an increase in the damping force generated. When the port 28 is closed by the shutter 17 and thus the first bypass passage $B_1$ is cut off, the hydraulic fluid in the cylinder upper chamber 1$a$ flows into the cylinder lower chamber 1$b$ through the main hydraulic fluid passage 3. Thus, relatively large damping force is generated by the effect of the orifice 6$a$ and disk valves 6$b$ of the damping force generating mechanism 6.

On the other hand, during the contraction stroke of the piston rod 7, the hydraulic fluid on the cylinder lower chamber side is pressurized to flow toward the cylinder upper chamber 1$a$ as the piston 2 slides. At this time, the check valves 30 are closed, and thus the first bypass passage $B_1$ is cut off. In addition, the hydraulic fluid on the cylinder lower chamber side flows into the chamber 16$a$ in the guide portion 16 through the orifice 32$a$ of the damping force generating mechanism 32, the passage 19, and the orifice passage 34, causing the shutter 18 to move toward the chamber 16$b$.

In this case, if the speed of the piston 2 is high and the amplitude of reciprocation thereof is small (i.e., high frequency), the flow rate of hydraulic fluid flowing into the chamber 16$a$ through the orifice passage 34 is relatively low, and hence the amount of movement of the shutter 18 toward the chamber 16$b$ is relatively small. Accordingly, the port 29 is still open to provide communication for the second bypass passage $B_2$. Therefore, the hydraulic fluid in the cylinder lower chamber 1$b$ flows into the cylinder upper chamber 1$a$ through the second bypass passage $B_2$, thereby generating relatively small damping force.

When the speed of the piston 2 is low and the amplitude of reciprocation increases (i.e., the frequency lowers), the flow rate of hydraulic fluid flowing into the chamber 16a through the orifice passage 34 increases, and hence the amount of movement of the shutter 18 toward the chamber 16b increases. Accordingly, the opening area of the port 29 decreases, and the flow resistance in the second bypass passage $B_2$ increases correspondingly, resulting in an increase in the damping force generated. When the port 29 is closed by the shutter 18 and thus the second bypass passage $B_2$ is cut off, the hydraulic fluid in the cylinder lower chamber 1b flows into the cylinder upper chamber 1a through the main hydraulic fluid passages 3 and 4. Thus, relatively large damping force is generated by the action of the damping force generating mechanism 5 and the orifice 6a of the damping force generating mechanism 6.

In addition, during the extension stroke, the pressure of hydraulic fluid on the cylinder upper chamber side acts on the chamber 16b of the guide portion 16 so as to press the shutter 18 toward the chamber 16a. Therefore, the shutter 18 which has moved toward the chamber 16b during the contraction stroke returns to the original position during the extension stroke. Similarly, during the contraction stroke, the pressure of hydraulic fluid on the cylinder lower chamber side acts on the chamber 5b of the guide portion 15 so as to press the shutter 17 toward the chamber 15a. Therefore, the shutter 17 which has moved toward the chamber 15b during the extension stroke returns to the original position during the contraction stroke. Accordingly, at the time when the extension and contraction strokes of the piston rod 7 are changed from one to the other, the bypass passage through which the hydraulic fluid is to flow is open to the full. Thereafter, the damping force characteristics are adjusted in accordance with the movement of the shutter.

Thus, for the same piston speed, when the frequency of the piston motion is high, relatively small damping force is generated during both extension and contraction strokes of the piston rod 7, whereas, when the frequency is low, relatively large damping force is generated during both extension and contraction strokes. In addition, at the time when the direction of stroke of the piston rod 7 changes from the extension side to the contraction side or vice versa, the damping force becomes small. Therefore, when the frequency of the piston motion is low, the damping force characteristics once change to "soft" when the directions of stroke change from one to the other, that is, when the piston speed is zero, and thereafter, the damping force characteristics return to "hard", as shown in FIG. 5. Accordingly, unlike the conventional frequency-sensitive hydraulic shock absorber, this embodiment is free from the problem that the damping force characteristics change to "hard" immediately after the directions of stroke have changed from one to the other. In addition, the damping force characteristics will not change from "hard" to "soft" during either the extension or contraction stroke. Therefore, it is possible to prevent occurrence of impact which would otherwise be generated by the changeover of the damping force characteristics during the extension or contraction stroke and hence possible to improve the ride quality of the vehicle. It should be noted that FIG. 5 shows damping force characteristics obtained when the piston rod in the hydraulic shock absorber of this embodiment is reciprocated at the different frequencies under which the piston speed at the center of stroke is constant. In the figure, (1), (2) and (3) show damping force characteristics at high frequency, intermediate frequency, and low frequency, respectively.

For comparison, damping force characteristics of the hydraulic shock absorber disclosed in the aforementioned Japanese Patent Application No. 2-283852 are shown in FIG. 7. FIG. 7 shows damping force characteristics obtained when the piston rod in the disclosed hydraulic shock absorber is reciprocated at the different frequencies under which the piston speed at the center of stroke is constant. In the figure, (1), (2) and (3) show damping force characteristics at high frequency, intermediate frequency, and low frequency, respectively.

A second embodiment of the present invention will next be explained with reference to FIG. 2. In the second embodiment, elements similar to those in the first embodiment are denoted by the same reference numerals, and only the portions in which the second embodiment is different from the first embodiment will be explained below in detail.

Figure 2:
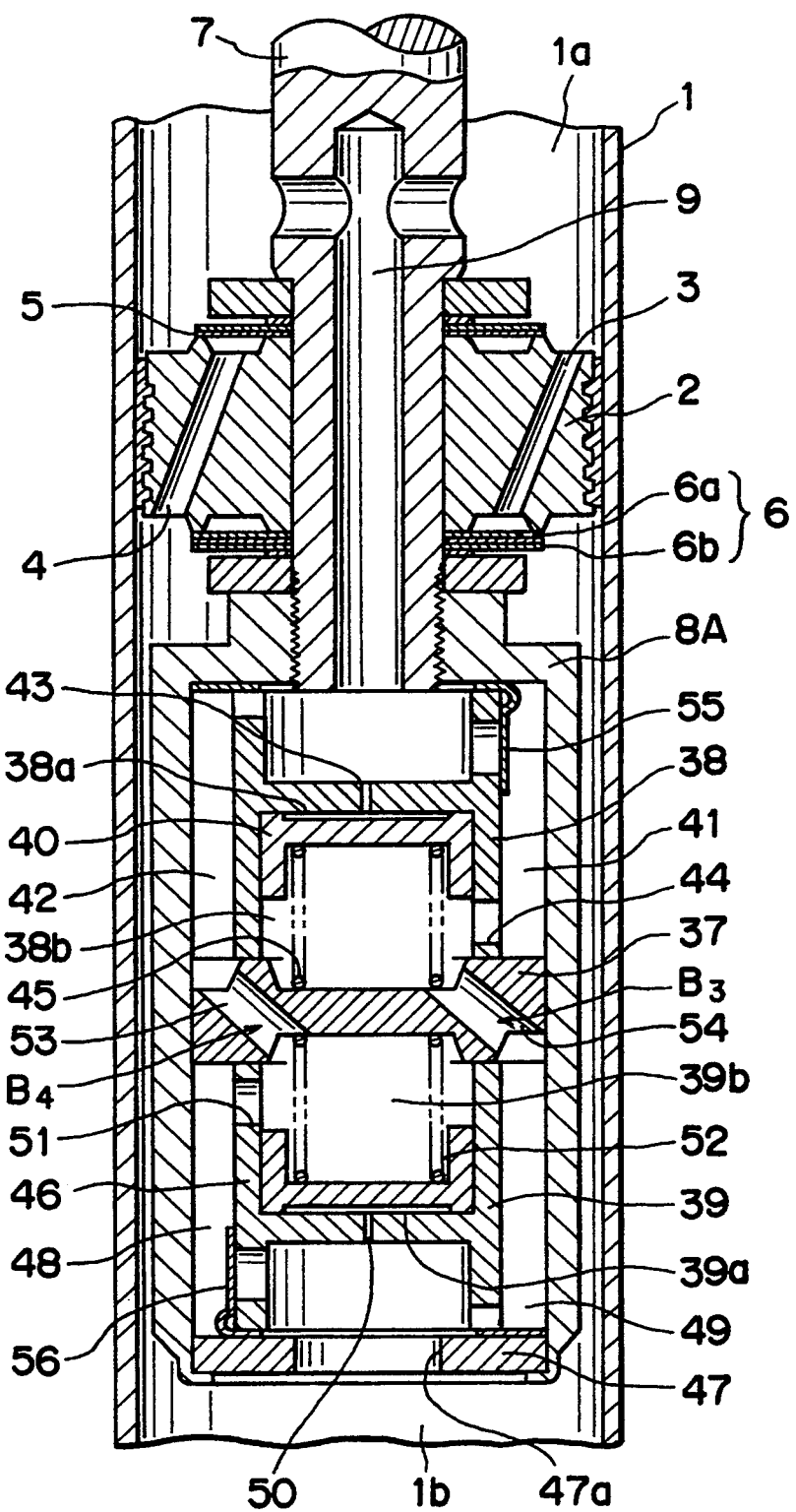
FIG. 2 is a longitudinal sectional view showing an essential part of a second embodiment of the present invention.

As shown in FIG. 2, a cylindrical passage member 8A is screwed onto one end portion of the piston rod 7 extending through the piston 2. The passage member 8A has a partition member 37 fitted therein to divide the inside of the passage member 8A into two spaces, that is, a space on the cylinder upper chamber side and a space on the cylinder lower chamber side. The cylinder upper chamber-side space is provided with a guide member 38, and the cylinder lower chamber-side space is provided with a guide member 39.

The guide member 38 has a shutter 40 slidably fitted therein. The shutter 40 divides the inside of the guide member 38 into two chambers, that is, a chamber 38a and a chamber 38b. The guide member 38 and the shutter 40 constitute in combination a first shutter mechanism. Between the guide member 38 and the side wall of the passage member 8A are formed two passages 41 and 42 which are communicated with the hydraulic fluid passage 9 in the piston rod 7. The chamber 38a of the first shutter mechanism is communicated with the hydraulic fluid passage 9 through an orifice passage 43 serving as a first communicating passage and a first orifice. The side wall of the guide member 38 is provided with a port 44 providing communication between the chamber 38b and the passage 41. The port 44 is disposed so that when the shutter 40 has been moved to the side of the chamber 38a, the port 44 is fully open, whereas, as the shutter 40 slides toward the chamber 38b, the port 44 decreases in the opening area and is eventually shut off. Between the shutter 40 and the partition member 37 secured to the guide member 38 is interposed a spring 45 serving as a first spring for biasing the shutter 40 toward the chamber 38a.

The guide member 39 has a shutter 46 slidably fitted therein. The shutter 46 divides the inside of the guide member 39 into two chambers, that is, a chamber 39a and a chamber 39b. The guide member 39 and the shutter 46 constitute in combination a second shutter mechanism. Between the guide member 39 and the side wall of the passage member 8A are formed two passages 48 and 49 which are communicated with the cylinder lower chamber 1b through an opening 47a formed in a spacer 47. The chamber 39a of the second shutter mechanism is communicated with the cylinder lower chamber 1b through an orifice passage 50 serving as a third communicating passage and a second orifice. The side wall of the guide member 39 is provided with a port 51 that provides communication between the chamber 39b and the passage 48. The port 51 is disposed so that when the shutter 46 has been moved to the side of the chamber 39a, the port 51 is fully open, whereas, as the shutter 46 slides toward the chamber 39b, the port 51 decreases in the opening area and is eventually shut off. Between the shutter 46 and the partition member 37 secured to the guide member 39 is interposed a spring 52 serving as a second spring for biasing the shutter 46 toward the chamber 39a.

The partition member 37 is provided with a passage 53 for communication between the passage 42 and the chamber 39b in the guide member 39, and a passage 54 for communication between the passage 49 and the chamber 38b in the guide member 38. Thus, a first bypass passage $B_3$ for providing communication between the cylinder upper chamber 1a and the cylinder lower chamber 1b is composed of the hydraulic fluid passage 9, the passage 41, the port 44, the chamber 38, the passage 54, and the passage 49. The passage 41 is provided with a check valve 55 that allows the hydraulic fluid to flow only from the cylinder upper chamber 1a toward the cylinder lower chamber 1b through the first bypass passage $B_3$. In addition, a second bypass passage $B_4$ for providing communication between the cylinder upper chamber 1a and the cylinder lower chamber 1b is composed of the hydraulic fluid passage 9, the passage 42, the passage 53, the chamber 39b, the port 51, and the passage 48. The passage 48 is provided with a check valve 56 that allows the hydraulic fluid to flow only from the cylinder lower chamber 1b toward the cylinder upper chamber 1a through the second bypass passage $B_4$.

Furthermore, the passage 54 in the partition member 37 and the passage 49 constitute in combination a second communicating passage that allows the chamber 38b of the first shutter mechanism to communicate with the cylinder lower chamber 1b. The passage 53 in the partition member 37 and the passage 42 constitute in combination a fourth communicating passage that allows the chamber 39b of the second shutter mechanism to communicate with the cylinder upper chamber 1a.

The operation of the second embodiment, arranged as described above, will be explained below.

Normally, the shutter 40 is biased toward the chamber 38a by the spring 45 to open the port 44, and the shutter 46 is also biased toward the chamber 39a by the spring 52 to open the port 51. Accordingly, both the first and second bypass passages $B_3$ and $B_4$ are open.

During the extension stroke of the piston rod 7, the hydraulic fluid on the cylinder upper chamber side is pressurized to flow toward the cylinder lower chamber 1b as the piston 2 slides. At this time, the check valve 56 is closed, and thus the second bypass passage $B_4$ is cut off. In addition, the hydraulic fluid on the cylinder upper chamber side flows into the chamber 38a in the guide member 38 through the hydraulic fluid passage 9 and the orifice passage 43, causing the shutter 40 to move toward the chamber 39b.

In this case, if the speed of the piston 2 is high and the amplitude of reciprocation thereof is small (i.e., high frequency), the flow rate of hydraulic fluid flowing into the chamber 38a through the orifice passage 43 is relatively low, and hence the amount of movement of the shutter 40 toward the chamber 38b is relatively small. Accordingly, the port 44 is still open to provide communication for the first bypass passage $B_3$. Therefore, the hydraulic fluid in the cylinder upper chamber 1a flows into the cylinder lower chamber 1b through the first bypass passage $B_3$, thereby generating relatively small damping force.

When the speed of the piston 2 is low and the amplitude of reciprocation increases (i.e., the frequency lowers), the flow rate of hydraulic fluid flowing into the chamber 38a through the orifice passage 43 increases, and hence the amount of movement of the shutter 40 toward the chamber 38b increases. Accordingly, the opening area of the port 44 decreases, and the flow resistance in the first bypass passage $B_3$ increases correspondingly, resulting in an increase in the damping force generated. When the port 44 is closed by the shutter 40 and thus the first bypass passage $B_3$ is cut off, the hydraulic fluid in the cylinder upper chamber 1a flows into the cylinder lower chamber 1b through the main hydraulic fluid passage 3. Thus, relatively large damping force is generated by the action of the orifice 6a and disk valves 6b of the damping force generating mechanism 6.

On the other hand, during the contraction stroke of the piston rod 7, the hydraulic fluid on the cylinder lower chamber side is pressurized to flow toward the cylinder upper chamber 1a as the piston 2 slides. At this time, the check valve 55 is closed, and thus the first bypass passage $B_3$ is cut off. In addition, the hydraulic fluid on the cylinder lower chamber side flows into the chamber 39a in the guide member 39 through the orifice passage 50, causing the shutter 46 to move toward the chamber 39b.

In this case, if the speed of the piston 2 is high and the amplitude of reciprocation thereof is small (i.e., high frequency), the flow rate of hydraulic fluid flowing into the chamber 39a through the orifice passage 50 is relatively low, and hence the amount of movement of the shutter 46 toward the chamber 39b is relatively small. Accordingly, the port 51 is still open to provide communication for the second bypass passage $B_4$. Therefore, the hydraulic fluid in the cylinder lower chamber 1b flows into the cylinder upper chamber 1a through the second bypass passage $B_4$, thereby generating relatively small damping force.

As the speed of the piston 2 lowers and the amplitude of reciprocation increases (i.e., the frequency lowers), the flow rate of hydraulic fluid flowing into the chamber 39a through the orifice passage 50 increases, and hence the amount of movement of the shutter 46 toward the chamber 39b increases. Accordingly, the opening area of the port 51 decreases, and the flow resistance in the second bypass passage $B_4$ increases correspondingly, resulting in an increase in the damping force generated. When the port 51 is closed by the shutter 46 and thus the second bypass passage $B_4$ is cut off, the hydraulic fluid in the cylinder lower chamber 1b flows into the cylinder upper chamber 1a through the main hydraulic fluid passages 3 and 4. Thus, relatively large damping force is generated by the effect of the damping force generating mechanism 5 and the orifice 6a of the damping force generating mechanism 6.

In addition, during the extension stroke, the pressure of hydraulic fluid on the cylinder upper chamber side acts on the chamber 39b of the guide member 39 so as to press the shutter 46 toward the chamber 39a. Therefore, the shutter 46 which has moved toward the chamber 39b during the contraction stroke returns to the original position during the extension stroke. Similarly, during the contraction stroke, the pressure of hydraulic fluid on the cylinder lower chamber side acts on the chamber 38b of the guide member 38 so as to press the shutter 40 toward the chamber 38a. Therefore, the shutter 40 which has moved toward the chamber 39b during the extension stroke returns to the original position during the contraction stroke. Accordingly, at the time when the extension and contraction strokes of the piston rod 7 are changed from one to the other, the bypass passage through which the hydraulic fluid is to flow is open to the full. Thereafter, the damping force characteristics are adjusted in accordance with the movement of the shutter.

Thus, for the same piston speed, when the frequency of the piston motion is high, relatively small damping force is generated during both the extension and contraction strokes of the piston rod 7, whereas, when the frequency is low, relatively large damping force is generated during both the extension and contraction strokes, in the same way as in the first embodiment. In addition, at the time when the direction of stroke of the piston rod 7 changes from the extension side to the contraction side or vice versa, the damping force becomes small. Accordingly, damping force characteristics such as those shown in FIG. 5 are obtained. Thus, the ride quality of the vehicle can be improved.

Figure 3:
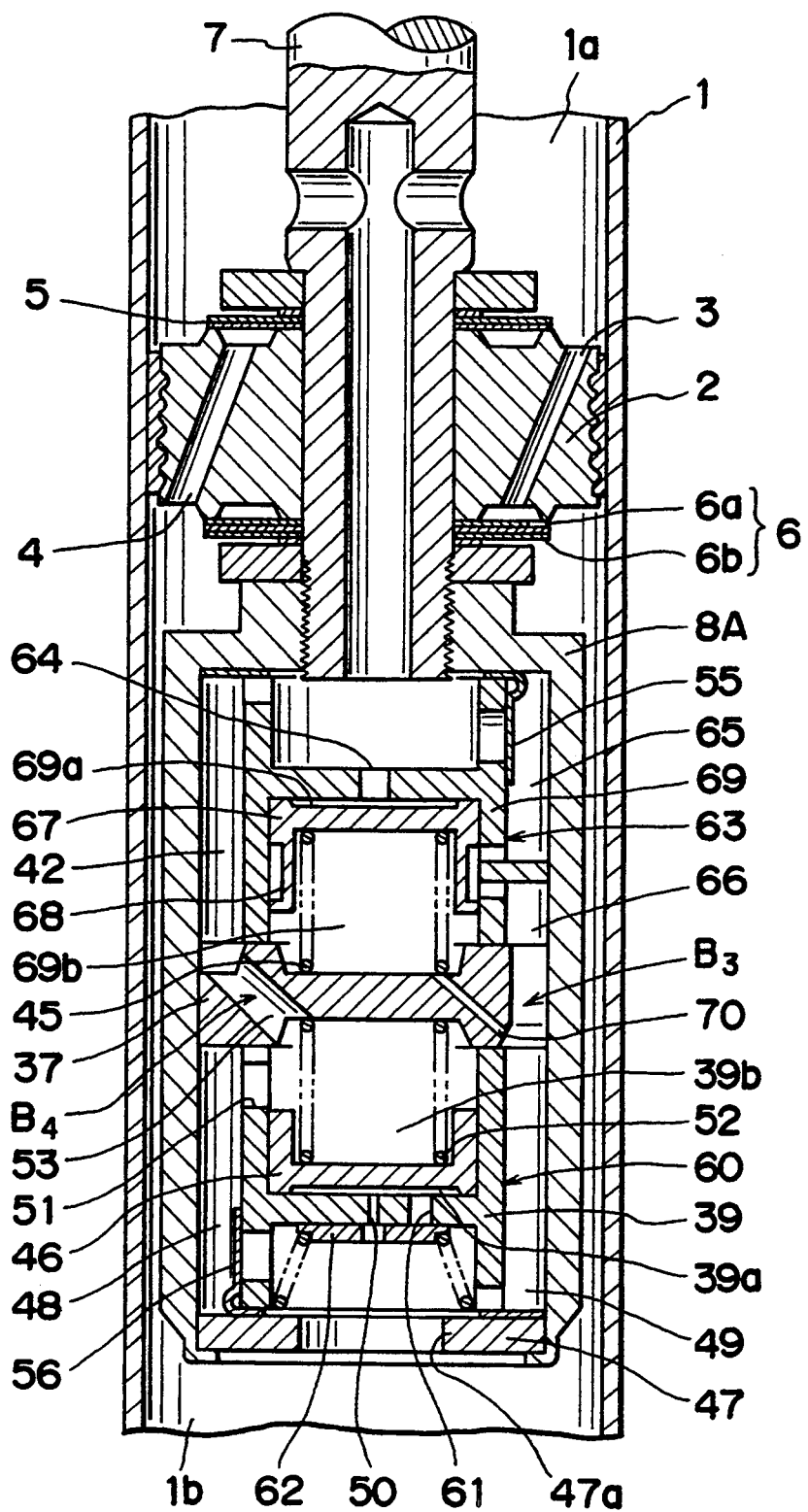
FIG. 3 is a longitudinal sectional view showing an essential part of a third embodiment of the present invention.

FIG. 3 shows a third embodiment of the present invention, which is a modification of the second embodiment. Only the portions in which the third embodiment differs from the second embodiment will be explained below.

A lower shutter mechanism 60 shown in FIG. 3 is provided with an orifice passage 50 and a passage 61 having a relatively large diameter. The passage 61 is provided with a one-way valve 62 that allows the hydraulic fluid to flow only from the chamber in the guide member 38 toward the cylinder lower chamber 1b. Accordingly, the hydraulic fluid flowing in through the orifice passage 50 flows out through the passage 61 without encountering resistance. Thus, the shutter 46 that has moved in the direction for closing the second bypass passage B4 can be quickly moved in the direction for opening it.

An upper shutter mechanism 63 shown in FIG. 3 is formed by modifying the passage and other arrangements of the corresponding part in the second embodiment. That is, the orifice passage 43 in the second embodiment is changed into a passage 64 having a relatively large diameter. Furthermore, the passage 41 is divided into an upper passage 65 and a lower passage 66. A shutter 67 has a groove 68 formed in the outer periphery thereof so that when the shutter 67 is held in an upper position by biasing force, the groove 68 provides communication between the upper and lower passages 65 and 66, whereas, as the shutter 67 moves downward, the upper and lower passages 65 and 66 are cut off from each other. The chamber 69b in the guide member 69 is communicated with the cylinder lower chamber 1b through an orifice passage 70. By virtue of this arrangement, during the extension stroke, the hydraulic fluid flows into the chamber 69a through the passage 64, and an amount of hydraulic fluid corresponding to the amount of hydraulic fluid flowing into the chamber 69a flows out of the chamber 69b toward the cylinder lower chamber side through the orifice passage 70 while being subjected to resistance. Accordingly, damping force that varies wlth the frequency of the piston motion is attained in the same way as in the second embodiment.

Next, a fourth embodiment, which is a modification of the first embodiment, will be explained with reference to FIG. 6. It should be noted that in FIG. 6 elements similar to those in the first embodiment, shown in FIGS. 1 and 4, are denoted by the same reference numerals, and only the portions in which the fourth embodiment differs from the first embodiment will be explained below in detail.

Figure 6:
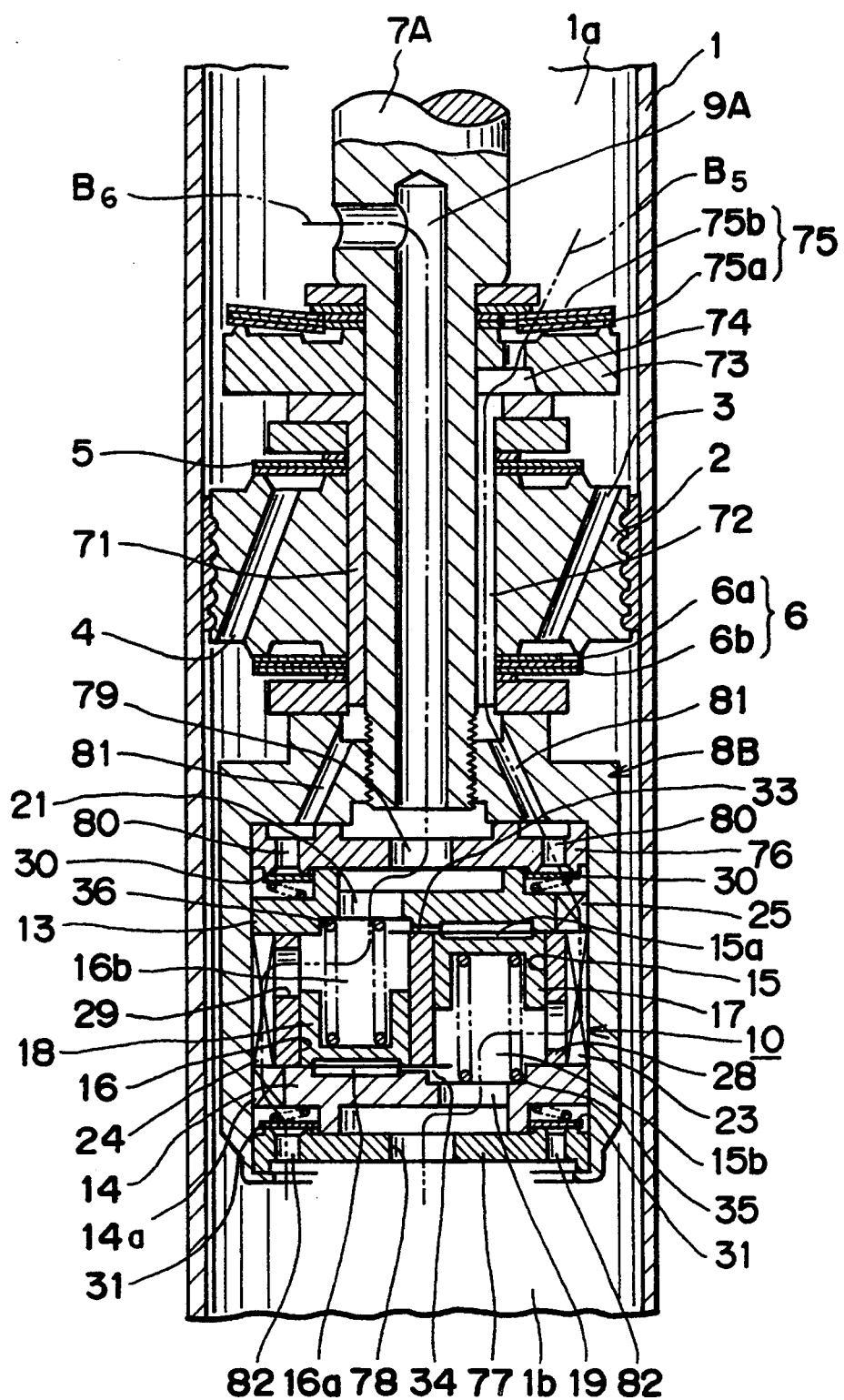
FIG. 6 is a longitudinal sectional view showing an essential part of a fourth embodiment of the present invention.

As shown in FIG. 6, a piston rod 7A is inserted into a passage member 71. The piston rod 7A extends through the piston 2, together with the passage member 71, and has a cylindrical passage member 8B screwed onto the distal end portion thereof, thereby being connected to the piston 2. The piston rod 7A is provided with an axial hydraulic fluid passage 9A which provides communication between the cylinder upper chamber 1a and the inside of the passage member 8B, which is provided in the cylinder lower chamber 1b. The passage member 8B and the hydraulic fluid passage 9A constitute in combination a bypass passage. The side wall of the passage member 71 is provided with an axial cut portion to form a hydraulic fluid passage 72 extending through the piston 2.

An annular valve member 73 is attached to the portion of the piston rod 7A that extends through the cylinder upper chamber 1a. The valve member 73 is provided with a passage 74 which is communicated at one end thereof with the hydraulic fluid passage 72 and opened at the other end thereof into the cylinder upper chamber 1a. The opening of the passage 74 is provided with a damping force generating mechanism 75 including an orifice 75a and disk valves 75b. The disk valves 75b are arranged such that when the pressure in the cylinder upper chamber 1a reaches a valve opening pressure, the inner peripheral portion of the disk valves 75b bend to open it, thereby controlling the flow of hydraulic fluid from the cylinder upper chamber 1a to the passage 74 so as to generate damping force. The damping force generating mechanism 75 is adapted to generate smaller damping force than that generated by the damping force generating mechanism 6 provided on the piston 2.

In the passage member 8B are fitted a guide member 10, valve members 76 and 77, and partition members 13 and 14. In addition, the chamber 15b of the first shutter mechanism is communicated with the cylinder lower chamber 1b through a second communicating passage comprising a passage 19 formed in the partition member 14 and a passage 78 formed in the valve member 77. The chamber 16b of the second shutter mechanism is communicated with the cylinder upper chamber 1a through a fourth communicating passage comprising a passage 21 formed in the partition member 13, a passage 79 formed in the valve member 76, and the hydraulic fluid passage 9A in the piston rod 7A. The valve member 76 is provided with passages 80 communicated with the passage 25 in the partition member 13. The passages 80 are communicated with the hydraulic fluid passage 72 through passages 81 provided in the passage member 8B. The valve member 77 is provided with passages 82 communicated with a passage 14a formed in the partition member 14. The passages 82 are communicated with the cylinder lower chamber 1b.

Thus, a first bypass passage B5 for providing communication between the cylinder upper chamber 1a and the cylinder lower chamber 1b is composed of the passage 74 in the valve member 73, the hydraulic fluid passage 72 in the passage member 71, the passages 81 in the passage member 8B, the passages 80 in the valve member 76, the passage 25 in the partition member 13, the passage 23 in the guide member 10, the port 28, the chamber 15b, the passage 19 in the partition member 14, and the passage 78 in the valve member 77. The passages 80 in the valve member 76 are provided with check valves 30 that allow the hydraulic fluid to flow only from the cylinder upper chamber 1a toward the cylinder lower chamber 1b through the first bypass passage $B_5$. In addition, a second bypass passage $B_6$ for providing communication between the cylinder upper chamber 1a and the cylinder lower chamber 1b is composed of the hydraulic fluid passage 9A in the piston rod 7A, the passage 79 in the valve member 76, the passage 21 in the partition member 13, the chamber 16b in the guide member 10, the port 29, the passage 24, the passage 14a in the partition member 14, and the passages 82 in the valve member 77. The passages 82 in the valve member 77 are provided with check valves 31 that allow the hydraulic fluid to flow only from the cylinder lower chamber 1b toward the cylinder upper chamber 1a through the second bypass passage $B_6$.

The operation of the fourth embodiment, arranged as described above, will be explained below.

Normally, the shutters 17 and 18 are biased by the respective springs 35 and 36 to open the ports 28 and 29, and hence both the first and second bypass passages $B_5$ and $B_6$ are open, in the same way as in the first embodiment.

During the extension stroke of the piston rod 7A, the hydraulic fluid on the cylinder upper chamber side is pressurized to flow toward the cylinder lower chamber 1b as the piston 2 slides. At this time, the check valves 31 are closed, and thus the second bypass passage $B_6$ is cut off. In addition, the hydraulic fluid on the cylinder upper chamber side flows into the chamber 15a in the guide member 15 through the hydraulic fluid passage 9A, the passage 79, the passage 21, and the orifice passage 33, causing the shutter 17 to move toward the chamber 16b.

In this case, if the speed of the piston 2 is high and the amplitude of reciprocation thereof is small (i.e., high frequency), the flow rate of hydraulic fluid flowing into the chamber 15a through the orifice passage 33 is relatively low, and hence the amount of movement of the shutter 17 toward the chamber 15b is relatively small. Accordingly, the port 28 is still open to provide communication for the first bypass passage $B_5$. Therefore, the hydraulic fluid in the cylinder upper chamber 1a flows into the cylinder lower chamber 1b through the first bypass passage $B_5$, thereby generating relatively small damping force.

As the speed of the piston 2 lowers and the amplitude of reciprocation increases (i.e., the frequency lowers), the flow rate of hydraulic fluid flowing into the chamber 15a through the orifice passage 33 increases, and hence the amount of movement of the shutter 17 toward the chamber 15b increases. Accordingly, the opening area of the port 28 decreases, and the flow resistance in the first bypass passage $B_5$ increases correspondingly, resulting in an increase in the damping force generated. When the port 28 is closed by the shutter 17 and thus the first bypass passage $B_5$ is cut off, the hydraulic fluid in the cylinder upper chamber 1a flows into the cylinder lower chamber 1b through the main hydraulic fluid passage 3. Thus, relatively large damping force is generated by the effect of the orifice 6a and disk valves 6b of the damping force generating mechanism 6.

On the other hand, during the contraction stroke of the piston rod 7A, the hydraulic fluid on the cylinder lower chamber side is pressurized to flow toward the cylinder upper chamber 1a as the piston 2 slides. At this time, the check valves 30 are closed, and thus the first bypass passage $B_5$ is cut off. In addition, the hydraulic fluid on the cylinder lower chamber side flows into the chamber 16a in the guide portion 16 through the passage 78, the passage 19, and the orifice passage 34, causing the shutter 18 to move toward the chamber 16b.

In this case, if the speed of the piston 2 is high and the amplitude of reciprocation thereof is small (i.e., high frequency), the flow rate of hydraulic fluid flowing into the chamber 16a through the orifice passage 34 is relatively low, and hence the amount of movement of the shutter 18 toward the chamber 16b is relatively small. Accordingly, the port 29 is still open to provide communication for the second bypass passage $B_6$. Therefore, the hydraulic fluid in the cylinder lower chamber 1b flows into the cylinder upper chamber 1a through the second bypass passage $B_6$.

As the speed of the piston 2 lowers and the amplitude of reciprocation increases (i.e., the frequency lowers), the flow rate of hydraulic fluid flowing into the chamber 16a through the orifice passage 34 increases, and hence the amount of movement of the shutter 18 toward the chamber 16b increases. Accordingly, the opening area of the port 29 decreases, and the flow resistance in the second bypass passage $B_6$ increases correspondingly, resulting in an increase in the damping force generated. When the port 29 is closed by the shutter 18 and thus the second bypass passage $B_6$ is cut off, the hydraulic fluid in the cylinder lower chamber 1b flows into the cylinder upper chamber 1a through the main hydraulic fluid passages 3 and 4. Thus, relatively large damping force is generated by the effect of the damping force generating mechanism 5 and the orifice 6a of the damping force generating mechanism 6.

In addition, during the extension stroke, the pressure of hydraulic fluid on the cylinder upper chamber side acts on the chamber 16b of the guide member 16 so as to press the shutter 18 toward the chamber 16a. Therefore, the shutter 18 which has moved toward the chamber 16b during the contraction stroke returns to the original position during the extension stroke. Similarly, during the contraction stroke, the pressure of hydraulic fluid on the cylinder lower chamber side acts on the chamber 15b in the guide portion 15 so as to press the shutter 17 toward the chamber 15a. Therefore, the shutter 17 which has moved toward the chamber 16b during the extension stroke returns to the original position during the contraction stroke. Accordingly, at the time when the extension and contraction strokes of the piston rod 7A are changed from one to the other, the bypass passage through which the hydraulic fluid is to flow is open to the full. Thereafter, the damping force characteristics are adjusted in accordance with the movement of the shutter.

Thus, for the same piston speed, when the frequency of the piston motion is high, relatively small damping force is generated during both extension and contraction strokes of the piston rod 7A, whereas, when the frequency is low, relatively large damping force is generated during both the extension and contraction strokes, in the same way as in the first embodiment. In addition, at the time when the direction of stroke of the piston rod 7A changes from the extension side to the contraction side or vice versa, the damping force becomes small. Accordingly, damping force characteristics such as those shown in FIG. 5 are obtained. Thus, the ride quality of the vehicle can be improved.

In the first embodiment, the orifice passage 34, which serves as a second orifice, is communicated with the cylinder lower chamber 1b through the orifice 32a of the damping force generating mechanism 32 provided in the first bypass passage $B_1$. Therefore, the passage area of the orifice 32a influences the movement of the shutter 18 and hence limits the freedom with which damping force characteristics of the damping force generating mechanism 32 can be set. In the fourth embodiment, however, the orifice passage 34 is directly communicated with the cylinder lower chamber 1b through the passage 78 formed in the valve member 77, and the damping force generating mechanism 75 is provided at the end of the first bypass passage $B_5$ which is closer to the cylinder upper chamber 1a. Accordingly, damping force characteristics of the damping force generating mechanism 75 can be set as desired.

According to the hydraulic shock absorber of the present invention, when the frequency of the piston motion is high, relatively small damping force is generated during both extension and contraction strokes, whereas, when the frequency is low, relatively large damping force is generated during both extension and contraction strokes. In addition, at the time when the direction of stroke of the piston rod changes from the extension side to the contraction side or vice versa, the damping force becomes small. As a result, relatively large damping force is generated for vibration of large amplitude and low frequency that take place for example when attitude of the vehicle changes as it is turned or braked, thereby quickly bringing the vibration into convergence. For vibration of small amplitude and high frequency that is caused by unevenness on the road surface, relatively small damping force is generated to absorb the vibration effectively and satisfactorily. Thus, both steering stability and ride quality of the vehicle can be improved. When the frequency of the piston motion is low, the damping force once becomes small when the directions of stroke change from one to the other, that is, when the piston speed is zero, and thereafter, the damping force becomes large again. Accordingly, unlike the conventional frequency-sensitive hydraulic shock absorber, the present invention is free from the problem that immediately after the directions of stroke have changed from one to the other, the damping force becomes large, causing impact. In addition, the damping force will not change over from high level to low level during either the extension or contraction stroke. Therefore, it is possible to prevent occurrence of impact which would otherwise be generated by the change-over of the damping force characteristics during the extension or contraction stroke and hence possible to improve the ride quality of the vehicle.

Although the present invention has been described through specific terms, it should be noted here that the described embodiments are not necessarily exclusive and that various changes and modifications may be made without departing from the scope of the invention which is limited solely by the appended claims.

What is claimed is:

1. A hydraulic shock absorber including a cylinder having a hydraulic fluid sealed therein and defining two cylinder chambers, main hydraulic fluid passage and first and second bypass passages for communicating said cylinder chambers with each other, and a piston slidably fitted in said cylinder, wherein flow of the hydraulic fluid in said main hydraulic fluid passage and said first and second bypass passages caused by sliding movement of said piston generates damping force, and passage areas of said first and second bypass passages are regulated to adjust damping force characteristics, said hydraulic shock absorber comprising:

a first check valve provided in said first bypass passage to allow the hydraulic fluid to flow only from one toward the other of said two cylinder chambers;

a first shutter mechanism including a guide means and a first shutter slidably fitted in said guide means to define two chambers in said guide, said first shutter mechanism being arranged such that when said first shutter moves toward one side, said first bypass passage is opened, whereas, when said first shutter moves toward the other side, said first bypass passage is closed;

a first spring abutting at one end thereof on said first shutter and at the other end thereof on said guide means to bias said first shutter toward said one side;

a first communicating passage for providing communication between the chamber defined in said guide means on said one side of said first shutter and one of said two cylinder chambers;

a second communicating passage for providing communication between the chamber defined in said guide means on the other side of said shutter and the other of said two cylinder chambers;

a first orifice provided in at least one of said first and second communicating passages;

a second check valve provided in said second bypass passage to allow the hydraulic fluid to flow only from the other toward the one of said two cylinder chambers;

a second shutter mechanism including said guide means and a second shutter slidably fitted in said guide means to define two chambers in said guide means, said second shutter mechanism being arranged such that when said second shutter moves toward one side, said second bypass passage is opened, whereas, when said second shutter moves toward the other side, said second bypass passage is closed;

a second spring abutting at one end thereof on said second shutter and at the other end thereof on said guide means to bias said second shutter toward said one side;

a third communicating passage for providing communication between the chamber defined in said guide means on one side of said second shutter and the other of said two cylinder chambers;

a fourth communicating passage for providing communication between the chamber defined in said guide means on the other side of said second shutter and said one of the two cylinder chambers; and a second orifice provided in at least one of said third and fourth communicating passages.

2. A hydraulic shock absorber according to claim 1, wherein said guide means comprises a guide member receiving said first and second shutters in a side-by-side relationship.

3. A hydraulic shock absorber according to claim 1, wherein said guide means comprises a first and second guide members disposed along the axial direction of said cylinder and respectively receiving said first and second shutters.

* * * * *